US010045332B2

(12) United States Patent
Kitazoe et al.

(10) Patent No.: US 10,045,332 B2
(45) Date of Patent: Aug. 7, 2018

(54) UE AUTONOMOUS RADIO RESOURCE CONFIGURATION EXTENSION

(71) Applicant: QUALCOMM Incorporated, San Diego, CA (US)

(72) Inventors: Masato Kitazoe, Tokyo (JP); Madhavan Srinivasan Vajapeyam, San Diego, CA (US); Amir Aminzadeh Gohari, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/706,549

(22) Filed: May 7, 2015

(65) Prior Publication Data
US 2015/0327249 A1 Nov. 12, 2015

Related U.S. Application Data

(60) Provisional application No. 61/991,095, filed on May 9, 2014.

(51) Int. Cl.
*H04W 72/04* (2009.01)
*H04W 56/00* (2009.01)
*H04J 11/00* (2006.01)
*H04W 74/00* (2009.01)
*H04W 52/50* (2009.01)
*H04W 76/28* (2018.01)
*H04W 76/15* (2018.01)
*H04W 76/02* (2009.01)
*H04W 76/04* (2009.01)

(52) U.S. Cl.
CPC ..... *H04W 72/0413* (2013.01); *H04J 11/0023* (2013.01); *H04W 52/50* (2013.01);
(Continued)

(58) Field of Classification Search
CPC ............. H04W 72/0413; H04W 52/50; H04W 56/0015; H04W 56/005; H04W 74/004;
(Continued)

(56) References Cited

U.S. PATENT DOCUMENTS

2011/0292854 A1* 12/2011 Terry ................... H04L 5/001
370/311
2013/0242829 A1 9/2013 Ge et al.
(Continued)

FOREIGN PATENT DOCUMENTS

EP 2911462 A2 8/2015
EP 2928251 A1 10/2015
(Continued)

OTHER PUBLICATIONS

ISA/EPO, International Search Report and Written Opinion of the International Searching Authority, Int'l Appl. No. PCT/US2015/029944, dated Oct. 21, 2015, European Patent Office, Rijswijk, NL, 11 pgs.
(Continued)

*Primary Examiner* — Walli Butt
(74) *Attorney, Agent, or Firm* — Holland & Hart LLP

(57) ABSTRACT

Systems, methods, and apparatuses for user equipment (UE) autonomous radio resource configuration extension are provided. As disclosed herein, a UE may operate in dual connectivity with two (or more) base stations, each providing a set of carriers (e.g., cell groups) for wireless communication. The UE may have a simultaneous connection with a carrier from each base station and may autonomously determine a timing difference between carriers of respective cell groups. The UE may adjust the timing of an operation in relation to a radio resource configuration of one or both carriers to account for the difference. In some examples, the UE autonomously adjusts a measurement gap operation or adjusts a discontinuous reception (DRX) operation to account for a determined timing difference between carriers. The autonomous UE timing adjustments may include extending or offsetting a time duration or adjusting one or more subframes in which the operation is performed.

27 Claims, 16 Drawing Sheets

(52) U.S. Cl.
CPC ..... *H04W 56/005* (2013.01); *H04W 56/0015* (2013.01); *H04W 74/004* (2013.01); *H04W 76/025* (2013.01); *H04W 76/048* (2013.01); *H04W 76/15* (2018.02); *H04W 76/28* (2018.02)

(58) Field of Classification Search
CPC . H04W 76/025; H04W 76/048; H04W 76/15; H04W 76/28; H04J 11/0023
USPC ....... 370/252, 311, 328, 329, 331, 338, 392; 455/444, 450
See application file for complete search history.

(56) References Cited

U.S. PATENT DOCUMENTS

| | | | | |
|---|---|---|---|---|
| 2013/0308481 | A1* | 11/2013 | Kazmi | H04W 24/02 370/252 |
| 2014/0341192 | A1* | 11/2014 | Venkob | H04L 5/001 370/336 |
| 2015/0223089 | A1* | 8/2015 | Chakraborty | H04W 24/08 370/252 |
| 2015/0327104 | A1* | 11/2015 | Yiu | H04W 24/10 455/450 |
| 2015/0327322 | A1* | 11/2015 | Huang | H04W 76/048 370/329 |
| 2017/0134976 | A1* | 5/2017 | Uchino | H04W 16/32 |
| 2017/0257788 | A1* | 9/2017 | Takahashi | H04W 24/10 |

FOREIGN PATENT DOCUMENTS

| | | | |
|---|---|---|---|
| WO | WO-2012044694 | A1 | 4/2012 |
| WO | WO-2012100200 | A2 | 7/2012 |
| WO | WO 2015167303 | A1 * | 11/2015 ............ H04W 56/00 |

OTHER PUBLICATIONS

IPEA/EPO, Second Written Opinion of the International Preliminary Examining Authority, Int'l Appl. No. PCT/US2015/029944, dated Apr. 20, 2016, European Patent Office, Rijswijk, NL, 7 pgs.

* cited by examiner

UE AUTONOMOUS RADIO RESOURCE CONFIGURATION EXTENSION

CROSS REFERENCES

The present application for patent claims priority to U.S. Provisional Patent Application No. 61/991,095 by Kitazoe et al., entitled "UE Autonomous Radio Resource Configuration Extension," filed May 9, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, e.g., a Long Term Evolution (LTE) system.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell.

Wireless communications systems may support carrier aggregation, in which several carriers from a common base station are aggregated to serve a UE. Additionally, wireless systems may support dual connectivity, in which a UE simultaneously maintains connections with two base stations on separate carriers. In dual connectivity applications, carriers associated with different base stations may be unsynchronized.

SUMMARY

The described features generally relate to one or more systems, methods, or apparatuses for user equipment (UE) autonomous radio resource configuration extension. As disclosed herein, a UE may operate in dual connectivity with two (or more) base stations. Each base station may provide a set of carriers, known as cell groups, and the UE may have a simultaneous connection with one or more carriers from each cell group. The UE may autonomously determine a timing difference between the carriers of the respective cell groups, and it may adjust the timing of an operation in relation to a radio resource configuration of one or both carriers to account for the difference. In some examples, the UE autonomously adjusts a measurement gap operation or adjusts a discontinuous reception (DRX) operation to account for a determined timing difference between carriers.

A method of wireless communication performed by a user equipment (UE) having dual connectivity with first and second network nodes comprising respective first and second cell groups is described. The method may include determining a timing difference between a first carrier of the first cell group and a second carrier of the second cell group, and adjusting a timing of at least one operation in relation to a radio resource configuration of the first carrier or the second carrier based at least in part on the timing difference.

An apparatus operable for dual connectivity wireless communication with first and second network nodes including respective first and second cell groups is described. The apparatus may include means for determining a timing difference between a first carrier of the first cell group and a second carrier of the second cell group, and means for adjusting a timing of at least one operation in relation to a radio resource configuration of the first carrier or the second carrier based at least in part on the timing difference.

A further apparatus operable for dual connectivity wireless communication with first and second network nodes including respective first and second cell groups is described. The apparatus may include at least one processor, a memory in electronic communication with the at least one processor, and instructions stored in the memory which, when executed by the at least one processor, cause the apparatus to determine a timing difference between a first carrier of the first cell group and a second carrier of the second cell group, and adjust a timing of at least one operation in relation to a radio resource configuration of the first carrier or the second carrier based at least in part on the timing difference.

A non-transitory computer-readable medium storing code in support of wireless communication performed by a user equipment (UE) having dual connectivity with first and second network nodes including respective first and second cell groups is described. The code may include instructions executable to determine a timing difference between a first carrier of the first cell group and a second carrier of the second cell group, and adjust a timing of at least one operation in relation to a radio resource configuration of the first carrier or the second carrier based at least in part on the timing difference.

In some examples, adjusting the timing includes offsetting the at least one operation in relation to the radio resource configuration by a number of subframes determined in accordance with the timing difference. In some examples, the at least one operation includes implementing a measurement gap on the second carrier, and adjusting the timing includes offsetting the measurement gap on the second carrier in relation to a measurement gap configuration of the first carrier. In certain examples, the operation includes a discontinuous reception (DRX) operation on the first carrier, and adjusting the timing includes offsetting a subframe in which radio frequency (RF) retuning is performed in connection with the DRX operation.

In some examples of the method, apparatuses, or non-transitory computer-readable medium described above, offsetting the measurement gap is based at least in part on a minimum gap length. Additionally or alternatively, in some examples offsetting the measurement gap includes aligning the measurement gap on the second carrier such that the measurement gap on the second carrier and a measurement gap on the first carrier overlap in time and the overlap includes a minimum gap length of the UE.

In some examples of the method, apparatuses, or non-transitory computer-readable medium described above, the adjusting is performed autonomously by the UE. In certain examples, determining the timing difference between the first carrier and the second carrier includes receiving broadcast information that includes frame numbering for the first and second carriers, measuring subframe timing of the first and second carriers, and identifying the timing difference based at least in part on the received frame numbering and the measured subframe timing.

Some examples of the method, apparatuses, or non-transitory computer-readable medium described above may further include receiving broadcast information that includes a measurement gap configuration for the first carrier. Accordingly, adjusting the timing of the at least one operation may be based at least in part on the received measurement gap configuration. In some examples, the first cell group includes a master cell group (MCG) and the second cell group includes a secondary cell group (SCG).

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A user equipment (UE) may be configured to autonomously identify and adjust for timing misalignments between carriers of different cell groups while having dual connectivity with corresponding base stations. While timing of carriers within cell groups may be synchronized with one another, in dual connectivity implementations, base stations may not be synchronized with one another. However, as disclosed herein, certain operations in the radio interface benefit from alignment among aggregated carriers from disparate cell groups.

It may, for instance, be beneficial for alignment between or among dual-connectivity carriers for measurement gap operation. That is, in some cases, it is beneficial to ensure a minimum tune-away duration (e.g., 5 ms) for UE measurement of other frequencies or radio access technologies (RATs). Additionally or alternatively, it may be beneficial for alignment between or among dual-connectivity carriers during on-durations (e.g., active durations) of a discontinuous reception (DRX) cycle. That is, in some instances, it is beneficial to minimize the time in which a UE's receiver is active, which may decrease power consumption while still accommodating reception with respect to different cell groups.

With carrier aggregation, timing alignment problems are avoided due to synchronization among the cells of a given base station. When operating in dual-connectivity, however, a UE cannot assume timing synchronization among the cells (or cell groups) of different network nodes. Hence, by operating according to the radio resource configuration for its respective cells or cell groups, the dual-connectivity UE may, for example, experience misalignment glitches in which it is unable to receive the control channel of its master cell group and is therefore not reachable by the network. Similarly, misalignment may present a situation in which the dual-connectivity UE is unable to perform measurements due to an insufficient measurement gap duration that results from conflicting configurations. Accordingly, as discussed herein, a UE operating in dual connectivity may determine a misalignment (e.g., a timing difference) between or among carriers of different cell groups, and the UE may autonomously adjust one or several operations with respect to its radio resource configuration to account or compensate for the timing difference.

The following description provides examples, and is not limiting of the scope, applicability, or configuration set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
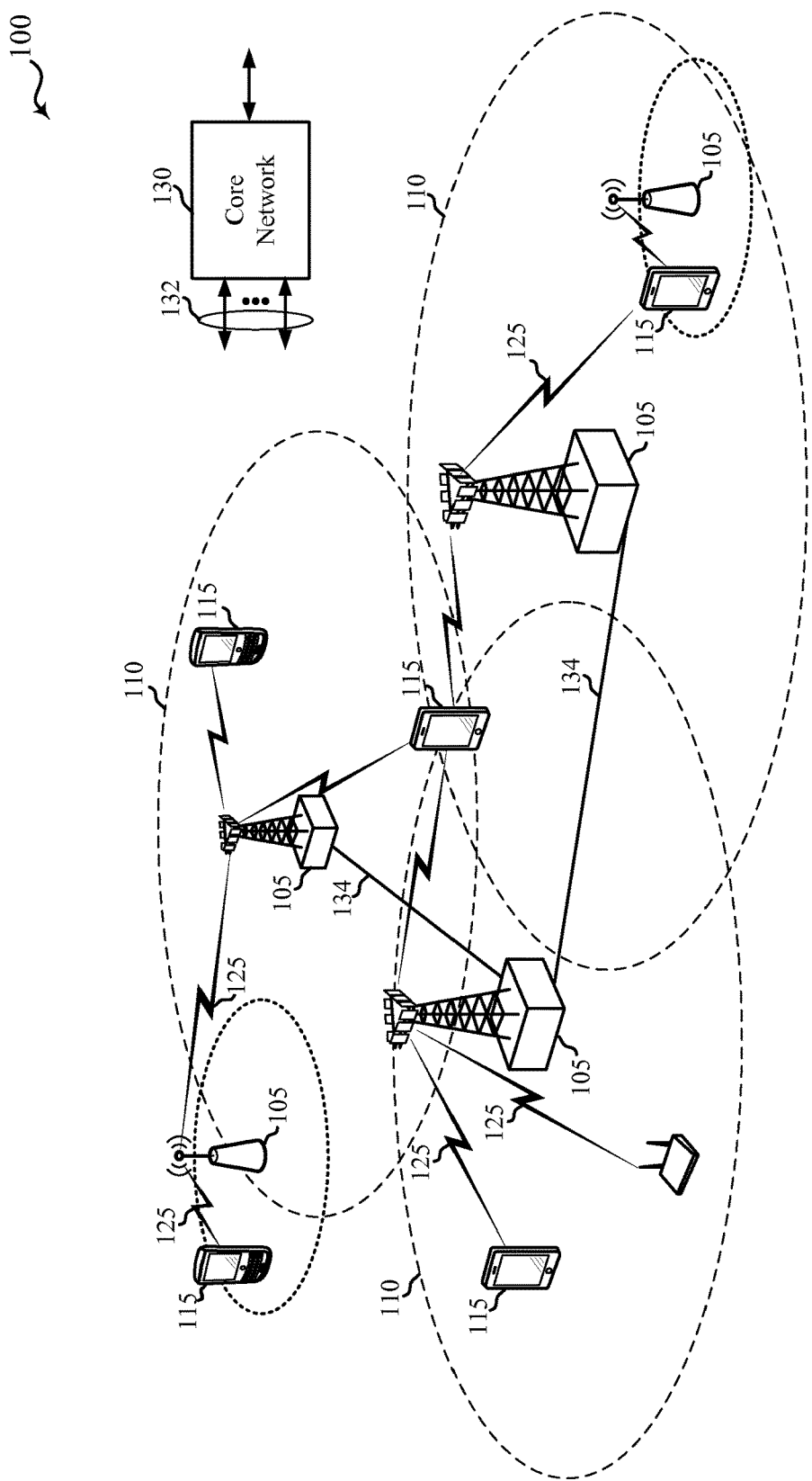
FIG. 1 illustrates an example of a wireless communications system.

FIG. 1 illustrates an example of a wireless communications system 100 in accordance with various aspects of the present disclosure. The wireless communications system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various examples. Base stations 105 may communicate control information or user data with the core network 130 through backhaul links 132. In examples, the base stations 105 may communicate, either directly or indirectly, with each other over backhaul links 134, which may be wired or wireless communication links.

The wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. A particular combination of carriers may dictate a manner in which a UE 115 performs. As described below, a UE 115 may be served by base stations 105 supporting different cell groups. A UE 115 may thus simultaneously communicate on carriers of different cell groups that may be unsynchronized. So, in some examples, a UE 115 determines a timing difference between carriers and adjusts one or several operations in relation to a radio resource configuration of the respective carriers or cell groups.

The base stations 105 may wirelessly communicate with the UEs 115 via one or more base station antennas. Each of the base station 105 sites may provide communication coverage for a respective geographic area 110. In some embodiments, a base station 105 may also be referred to as a base transceiver station, a radio base station, an access point, a radio transceiver, a basic service set (BSS), an extended service set (ESS), a NodeB, evolved node B (eNB), Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, or pico base stations). There may be overlapping coverage areas for different technologies.

The wireless communications system 100 may be a Heterogeneous Long Term Evolution (LTE)/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, directly or indirectly, via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations 105 may have different frame timing, and transmissions from different base stations may not be aligned in time. In a dual-connectivity configuration, a UE may be served from different base stations that make up base band units (BBU), and which may each have one or more remote radio heads (RRH). In such a configuration, different BBUs (e.g., base stations 105) may communicate to directly with one another via backhaul links 134, but the backhaul between BBUs may be non-ideal and may limit the efficiency with which the BBUs may share information (e.g., synchronization or timing information). A UE 115 may therefore be configured to account for unsynchronized carriers from base stations 105 of different BBUs.

The UEs 115 may be dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in wireless communications system 100 may include uplink (UL) transmissions from a UE 115 to a base station 105, or downlink (DL) transmissions, from a base station 105 to a UE 115 over DL carriers. The downlink transmissions may also be called forward link transmissions while the uplink transmissions may also be called reverse link transmissions. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. As discussed in more detail below, the timing of different carriers may be such that a UE 115 may receive carriers having frames (and subframes) that are misaligned in time. A UE 115 may thus adjust timing of operations, including measurement gap generation or discontinuous reception (DRX) operations. These adjustments may include offsetting (e.g., extending) an operation in relation to a radio resource configuration by a number of subframes determined, by the UE 115, in accordance with a timing difference of the received carriers.

Figure 2:
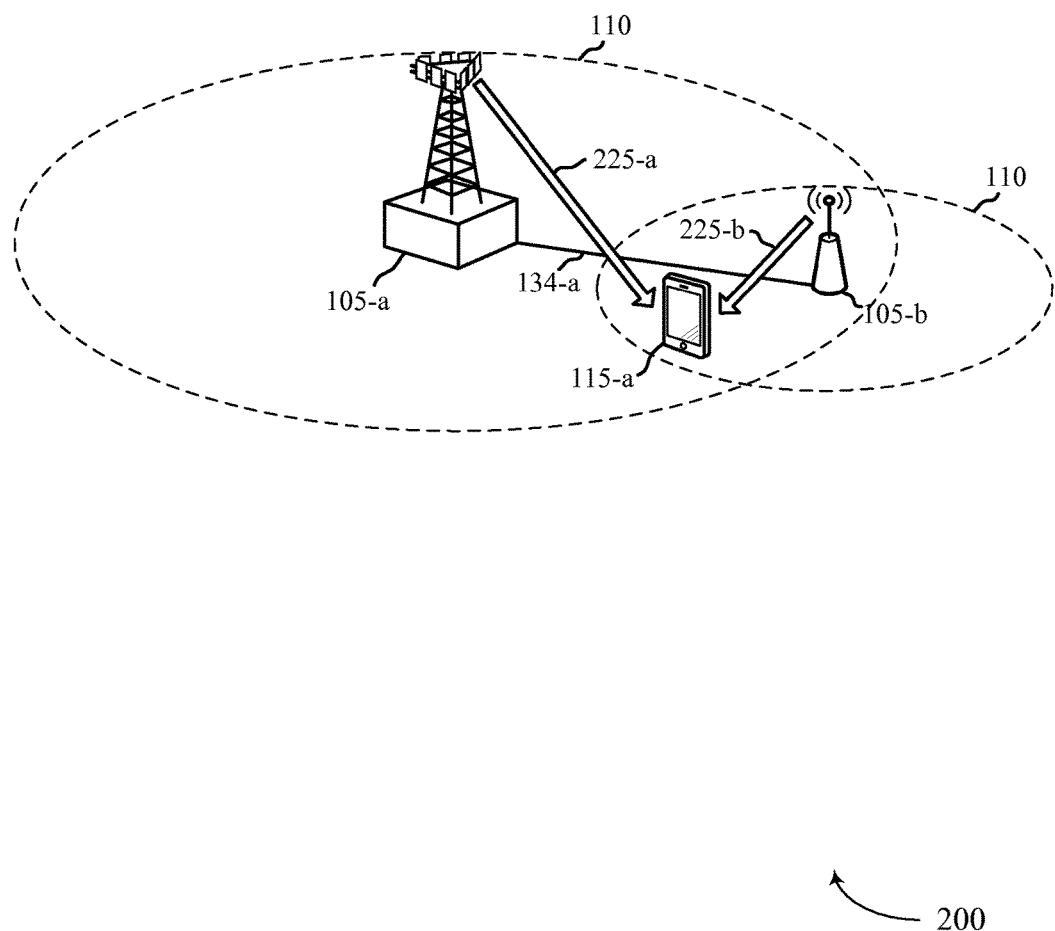
FIG. 2 shows aspects of a dual-connectivity UE according to the present disclosure.

FIG. 2 illustrates an example of a wireless communications system 200 with a UE or UEs 115 capable of autonomous radio resource configuration extension in accordance with various aspects of the present disclosure. The wireless communications system 200 may be an example of aspects of the wireless communications system 100 of FIG. 1. The wireless communications system 200 includes a base station 105-a (e.g., a network node), which may be associated with a master cell group (MCG), and a base station 105-b (e.g., a network node), which may be associated with a secondary cell group (SCG). The base station 105-a may, for instance, be a LTE macro cell, while the base station 105-b may be an LTE pico cell, an RRH, etc. Each of the base stations 105 may have an independent scheduler (not shown); and each base station 105 may have a respective coverage area 110. An MCG may be a cell group (also referred to as a carrier group) that includes a primary cell (e.g., primary component carrier (PCC), PCell, etc.). An SCG may be a cell group that does not include a PCell, but which may be configured with a physical uplink control channel (PUCCH) enabled secondary cell (SCell). Carriers within each group may be synchronized with one another. For instance, each carrier within an MCG may be synchronized with other carriers of the MCG; and each carrier within an SCG may be synchronized with other carriers of the SCG. Carriers of the MCG may, however, be unsynchronized with respect to carriers of the SCG.

The base stations 105-a, 105-b may be in communication with one another via a non-ideal backhaul link 134-a. So, while the connected mode UE consumes radio resources from both the master and secondary cell groups, there is no requirement that the base stations 105 maintain synchronization between their collective cells or cell groups. This is unlike carrier aggregation in which synchronization is maintained among the cells of a particular base station. The existence of a non-ideal backhaul and separate schedulers may have other effects as well, for example, concerning the respective radio resource configurations associated with cells of the MCG (e.g., carriers associated with the base station 105-a) and the SCG (e.g., carriers associated with the base station 105-b) and the ability of one base station serving a dual-connectivity UE to accommodate operation of another base station serving the dual-connectivity UE.

The UE 115-a may, for example, have dual connectivity with the base stations 105-a, 105-b, and thus may be communicating via a carrier 225-a of the MCG and a carrier 225-b of the SCG. The UE 115-a may determine a timing difference between the carrier 225-a of the MCG and the carrier 225-b the SCG. The UE 115 may therefore adjust a timing of an operation in relation to a radio resource configuration of the carrier 225-a or the carrier 225-b based, in whole or part, on the determined timing difference. In certain examples, the UE 115 may implement a measurement gap on a carrier (e.g., a carrier of the MCG or SCG). In some examples, adjusting the timing includes offsetting the operation (e.g., adjusting a measurement gap, modifying a DRX operation, etc.) in relation to the radio resource configuration, where the offsetting may be by a number of subframes determined in accordance with the timing difference.

In order to determine a timing difference between carriers 225-a, 225-b, the UE 115-a may receive broadcast information, including frame numbering, over each of the carriers 225-a, 225-b. The UE 115-a may measure subframe timing of the carriers 225-a, 255-b, respectively. Then, based on the received frame numbering and the measured subframe timing, the UE 115-a may identify the timing difference between carriers 225-a, 225-b.

Figure 3A:
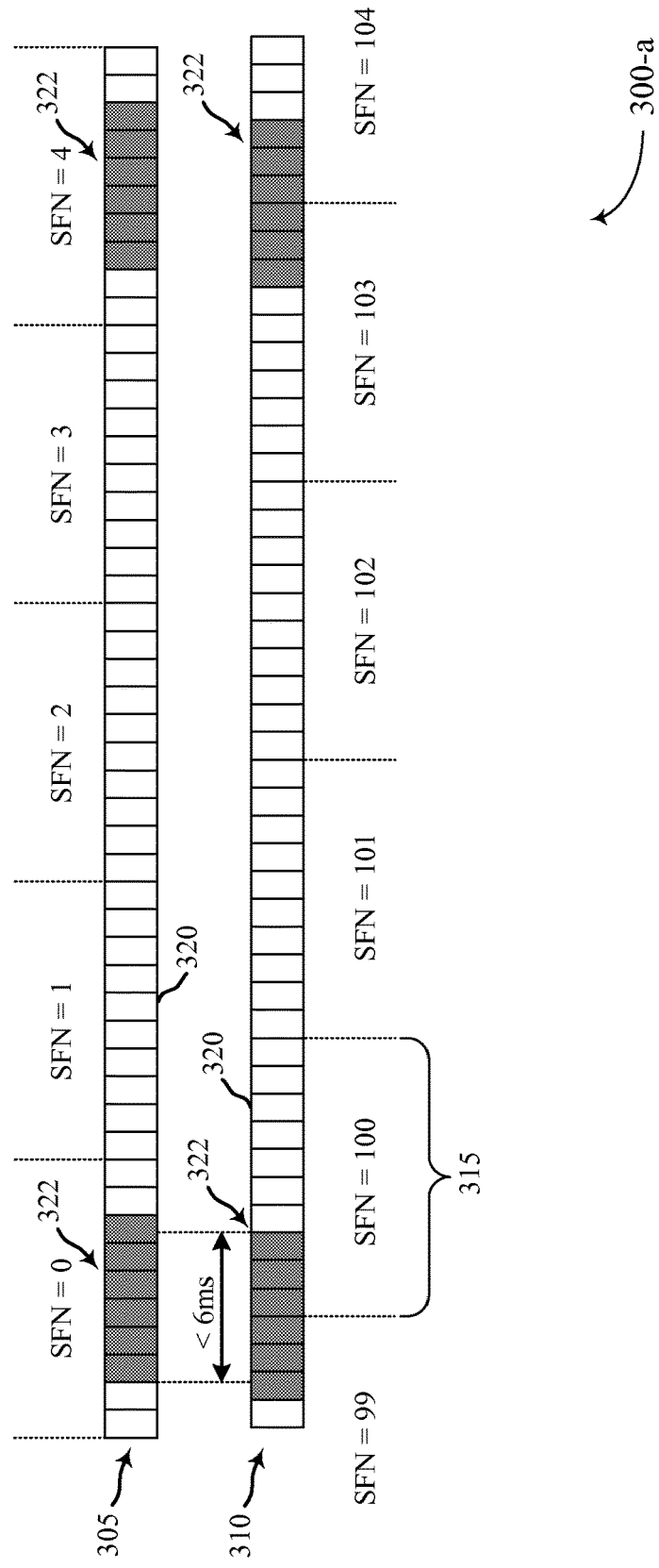
FIG. 3A illustrates an example of a timing difference between carriers of different cell groups.

Turning next to FIG. 3A, illustrated is an example 300-a of a timing difference between radio resource configurations of carriers of different cell groups in a dual connectivity setting. In this example, configured measurement gaps 322 do not align between carriers due to differences in subframe timing for a carrier 305 of a first cell group (e.g., MCG) and subframe timing for a carrier 310 of a second cell group (e.g., SCG) as shown. Five frames 315 of each carrier are depicted, but those skilled in the art will recognize the general applicability to complete radio resource configurations of a carrier. Each frame 315 consists of ten (10) subframes 320 of 1 ms duration.

Base stations 105 (FIGS. 1 and 2) in a dual connectivity setting may be able to identify some timing differences between their respective carriers, in some cases. But as discussed, misalignment of carriers (e.g., frame/subframe timing) or cell groups of the different base stations may occur and create difficulties for the dual-connectivity UE to operate in accordance with its RRC configuration. Here, configured measurement gap patterns 322 may be based on subframe timing; as shown in the example, misalignment of frames/subframes between carriers 305, 310 can result in misaligned measurement gap patterns 322.

As mentioned above, a measurement gap is a time duration during which a UE 115 may tune away from a frequency of its serving carrier in order to perform measurements of other frequencies or other RATs. A UE 115 may implement a measurement gap on a carrier of a cell group. A minimum measurement gap length (or duration) can be defined to permit a UE to tune away, acquire measurements, and return to its serving cell. In LTE systems, a minimum measurement gaps of 6 ms may be used, which provides at least 5 ms for the UE 115 to tune away from the serving LTE link (e.g., carrier) in order to perform measurements of other frequencies or RATs. The remaining 1 ms may be used for retuning the UE's 115 radio frequency (RF) components—e.g., returning to the serving link. As depicted in the example 300-a, however, it may not be possible for a UE 115 to secure the minimum LTE measurement gap duration of 6 ms due to the difference between the subframe timing 305 of the first cell group and the subframe timing 310 of the second cell group. That is, as depicted, the time period in which the measurement gap patterns 322 of the respective carrier groups overlap is less than 6 ms.

To address this misalignment in frame/subframe timing, a UE 115 may determine a timing difference between carriers of the respective cell groups, and it may adjust the timing of an operation in relation to the radio resource configuration of one or both carriers. For example, the UE 115 may autonomously extend the measurement gap 322 of either the MCG or the SCG, or both, so that the extended gap will completely cover the measurement gap of the other cell group, thus ensuring availability of a minimum measurement gap duration.

Figure 3B:
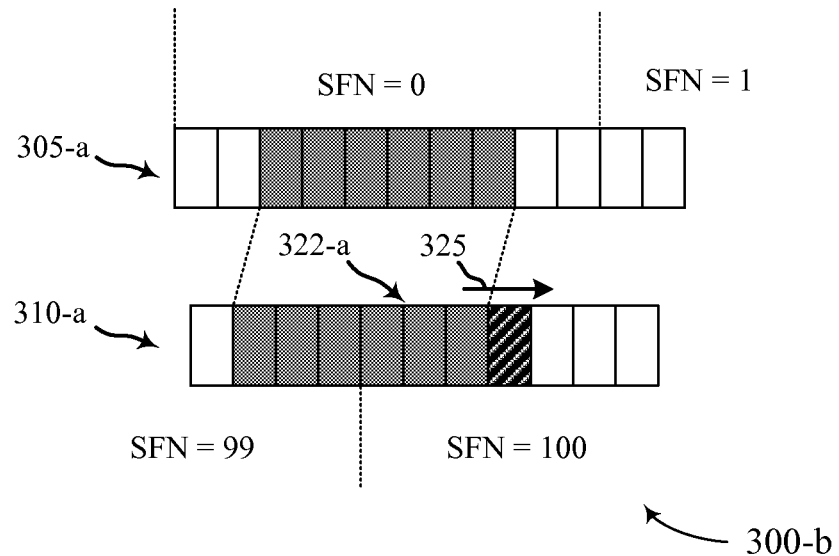
FIGS. 3B and 3C illustrate examples of a timing adjustment of a measurement gap operation in relation to a UE radio resource configuration.
Figure 3C:
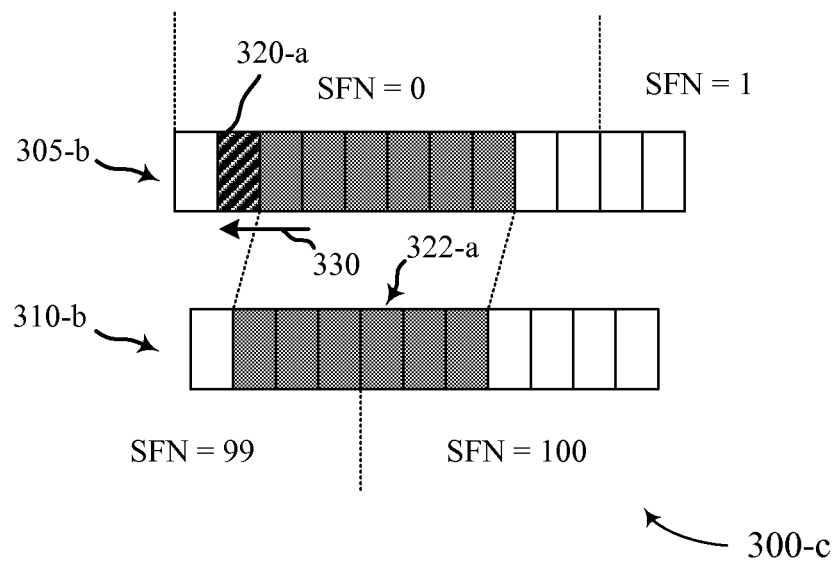

FIGS. 3B and 3C illustrate examples 300-b, 300-c of a timing adjustment(s) of a measurement gap operation(s) in relation to a radio resource configuration of a dual-connectivity UE. A UE 115 may determine a measurement gap or measurement gap pattern 322-a on one or several serving carriers according to its RRC configuration. As shown, UE 115 may autonomously adjust timing of the measurement gap by, for example, extending 325 the measurement gap in relation to a measurement gap configuration 322-a of the corresponding radio resource configuration—e.g., the subframe timing 310-a of the second cell group. Additionally or alternatively, the UE 115 may extend 330 the measurement gap in relation to a measurement gap configuration 322-a of the corresponding radio resource configuration—e.g., the subframe timing 305-b of measurement gaps for the first cell group.

In some examples, extending the measurement gap may be based, wholly or partially, on a minimum gap length for the UE 115 (e.g., 6 ms). As shown in FIG. 3C, for example, the measurement gap may be extended by one subframe 320-a, and thus by 1 ms. As depicted in the examples, 300-b and 300-c, extending the measurement gap may include extending the measurement gap on the first carrier or the second carrier such that the measurement gap on the first carrier and the measurement gap on the second carrier overlap in time. This overlap may include a minimum gap length for the UE 115 to acquire measurements. In some examples, the UE 115-a (FIG. 2) may report a gap length extension to the base station 105-a or the base station 105-b. The reported gap length extension may be based on the UE-determined timing difference, and it may be indicative of a number of subframes utilized for the measurement gap. Either or both base stations 105 may rely on the report to identify or determine a number of subframe lost for available transmissions (e.g., DL transmissions).

Figure 4A:
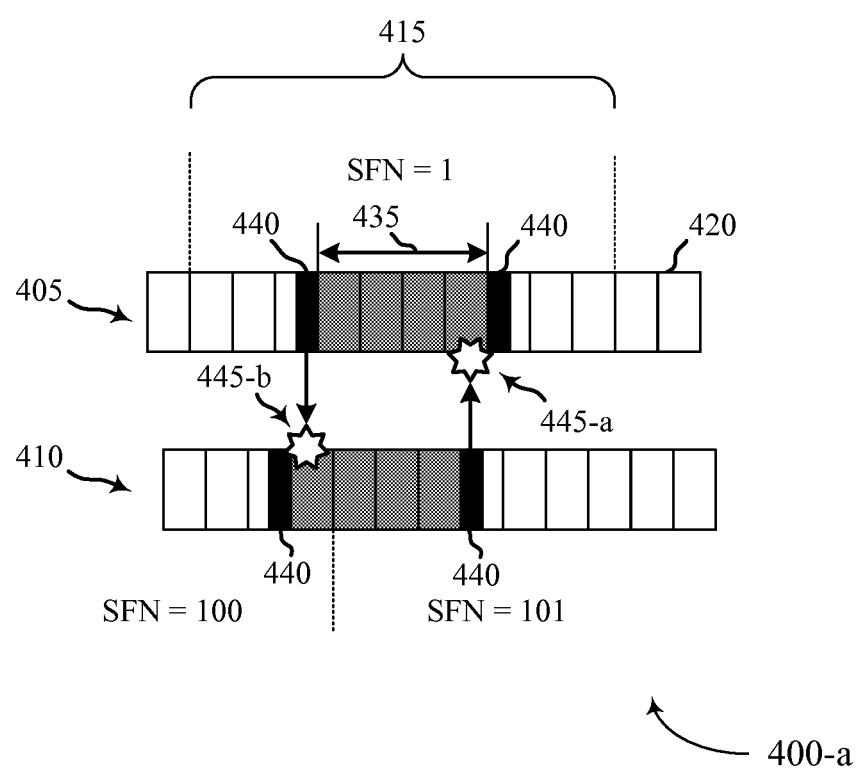
FIG. 4A illustrates an example of a timing difference between carriers of different cell groups observed by a dual-connectivity UE.

Next, FIG. 4A illustrates a further example 400-*a* of a timing difference between carriers of different cell groups in a dual connectivity setting. This example illustrates timing differences associated with a configured DRX operation of a dual-connectivity UE. As with FIG. 3A, subframe timing 405 for a first cell group (e.g., MCG) and subframe timing 410 for a second cell group (e.g., SCG) is shown. Portions of radio frames 415 of each carrier are depicted, but those skilled in the art will recognize the general applicability to the wider radio resource configuration of the dual-connectivity UE. Each frame 415 consists of ten (10) subframes 420 of 1 ms duration and, as illustrated, may be identified by a corresponding system frame number (SFN).

Depicted is a discontinuous reception (DRX) operation for the first and second carriers. The DRX on-duration (e.g., active DRX duration) 435 is a number of subframes (e.g., 4 subframes or 4 ms). In the active DRX duration, a UE 115 monitors the physical downlink control channel (PDCCH) from the serving base station(s). It may be beneficial, for the purpose of optimizing UE power consumption, to align the on-durations of an MCG and SCG as much as possible. Yet, as explained above, it may not be possible to completely align link timing, and thus it may not be possible to completely align the on-durations in the different cell groups.

If a UE 115 follows only its DRX configuration, RF retuning 440 for one cell group may affect the on-duration of another cell group. Example 400-*a* illustrates a situation in which RF retuning 440 for the SCG subframe timing 410 on-duration creates a "glitch" 445-*a* in the MCG on-duration. That is, because the UE 115 may retune 440 on one carrier during the DRX on-duration of another carrier, the UE 115 is not fully engaged in a DRX configuration for the complete DRX on-duration for either carrier. In other words, the retuning 440 on one carrier cuts short the DRX on-duration of the other carrier. This "glitch" 445-*a* in the MCG on-duration may cause the UE 115 to be unable to receive PDCCH from the MCG, which may render the UE 115 unreachable by the network. Likewise, the retuning may cause a "glitch" 445-*b* in the SCG on duration.

Figure 4B:
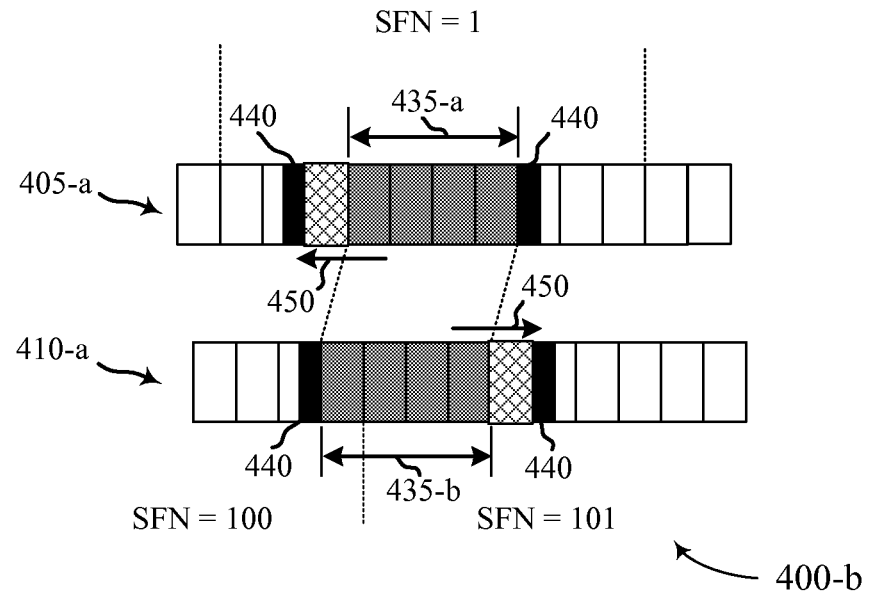
FIGS. 4B and 4C illustrate examples of a timing adjustment of a DRX operation in relation to a UE radio resource configuration.
Figure 4C:
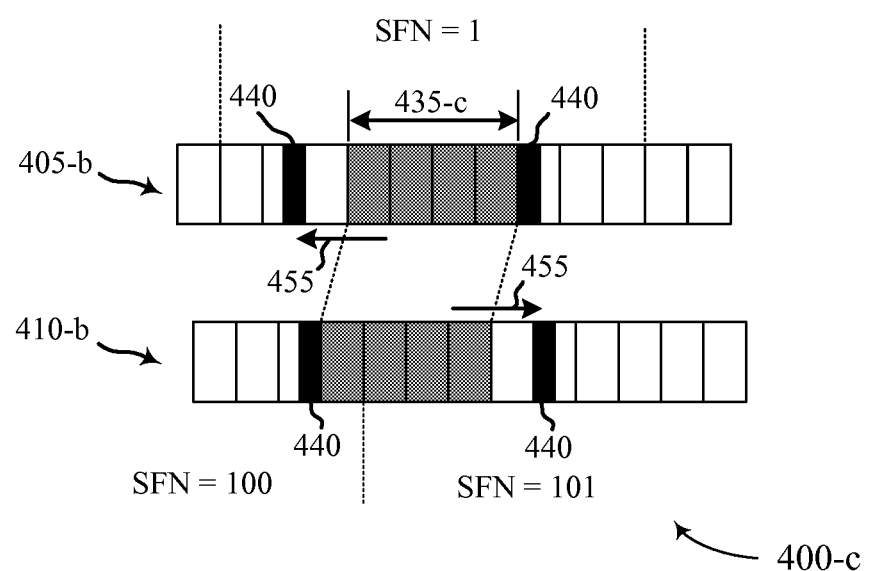

FIGS. 4B and 4C illustrate examples 400-*b*, 400-*c* of a timing adjustment or adjustments of a DRX operation(s) in relation to a radio resource configuration of a dual-connectivity UE. When the potential for a glitch due to different subframe timing is detected, UE 115 may extend 450 an active DRX duration for one or both of the carriers in relation to their corresponding radio resource configurations, such as shown for the subframe timing of DRX operations for carriers 405-*a*, 410-*a*. In some examples, extending the active DRX duration includes accommodating control channel reception on one or several carriers for at least the configured on-duration and may be performed autonomously by the UE. For example, retuning 440 is scheduled such to accommodate the full DRX on-duration 435-*a*, 435-*b* of both carriers.

In some examples, the UE 115 may autonomously adjust the timing by offsetting 455 a subframe in which radio frequency (RF) retuning 440 may be performed based on activity one or several cell groups. Offsetting 455 the subframe may include accommodating reception during an active DRX duration 435-*c* on a carrier. For instance, retuning 440 in SFN 101 of the SCG 410-*b* may be offset 455 to accommodate control channel reception on the MCG 405-*b* during its DRX on-duration 435-*c*.

Figure 5:
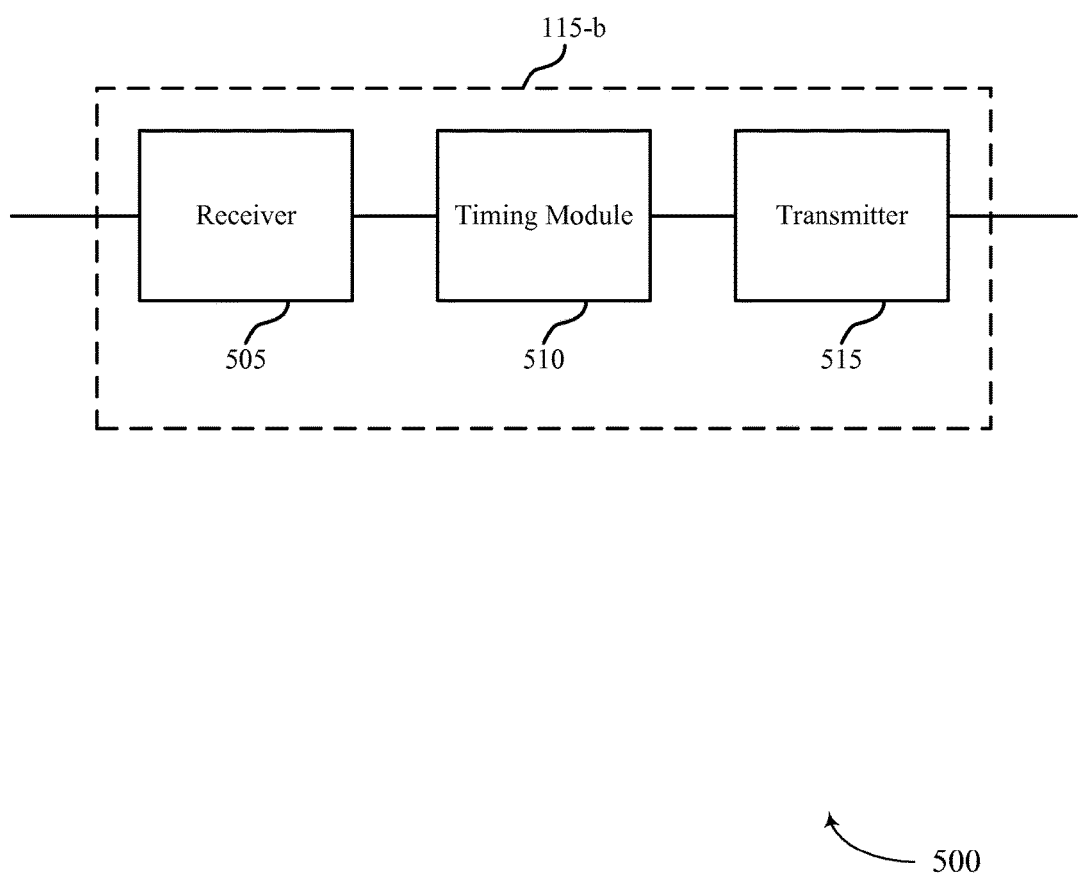
FIG. 5 shows a block diagram of a dual-connectivity device configured for autonomous timing adjustment.

Next, FIG. 5 shows a block diagram 500 of a UE 115-*b* configured for autonomous timing adjustment of RRC configured operations based on a timing difference between carriers or cell groups of its respective base stations. The UE 115-*b* may be an example of one or more aspects of the UEs 115 described with reference to FIGS. 1-4. The UE 115-*b* may include a receiver 505, a timing module 510, and a transmitter 515. The UE 115-*b* may also include a processor. Each of these components may be in communication with each other.

The components of the UE 115-*b* may, individually or collectively, be implemented with one or several application specific integrated circuits (ASICs) adapted to perform some or all of the functions described herein in hardware. Alternatively, the functions may be performed by one or more other processing units (or cores), on one or more ICs. In other examples, other types of integrated circuits may be used (e.g., Structured/Platform ASICs, a field programmable gate array (FPGA), or another Semi-Custom IC), which may be programmed or configured in any manner known in the art. The functions of each unit may also be implemented, in whole or in part, with instructions embodied in a memory, formatted to be executed by one or more general or application-specific processors.

The receiver 505 may be configured to receive information such as packets, user data, or control information associated with various information channels (e.g., control channels, data channels, etc.). The received information may be passed on to the timing module 510, and to other components of the UE 115-*b*. In some examples, the receiver 505 may be configured to receive broadcast information, including frame numbering over one or more carriers.

The timing module 510 may be configured to determine a timing difference between a first carrier of a first cell group and a second carrier of a second cell group. The timing module 510 may also be configured to adjust a timing of one or more operations in relation to a radio resource configuration of the first carrier or the second carrier based, wholly or partially, on the determined timing difference.

The transmitter 515 may be configured to transmit the one or more signals received from other components of the UE 115-*b*. In some aspects, the transmitter 515 may be collocated with the receiver 505 in a transceiver module. The transmitter 515 may include a single antenna, or it may include a plurality of antennas. In some examples, the transmitter 515 may be configured to report a gap length extension to a base station, where the gap length extension is based on a determined timing difference between carriers and may be indicative of a number of subframes utilized for a measurement gap. In some cases, transmitter 515 may send a subframe timing difference or an indication of a measurement gap adjustment to a base station.

Figure 6:
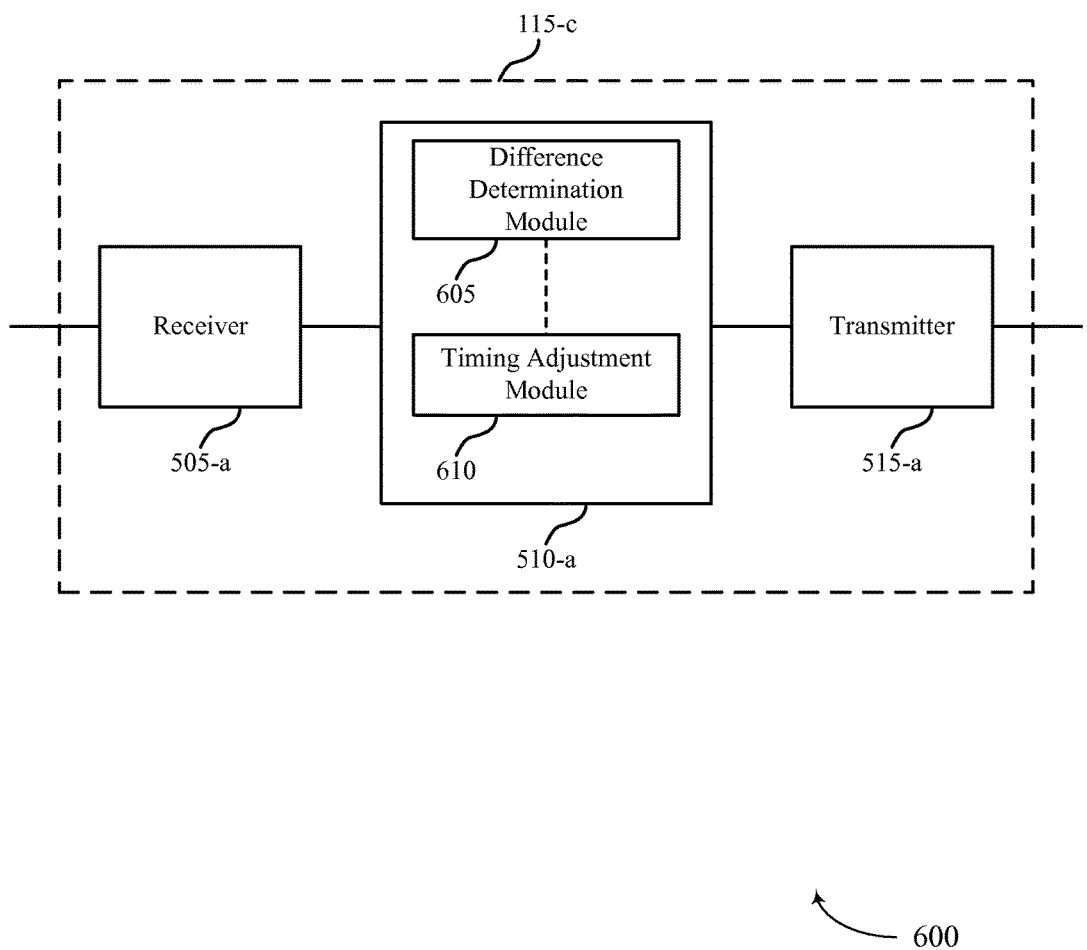
FIG. 6 shows a block diagram of a dual-connectivity device configured for autonomous timing adjustment.

FIG. 6 shows a block diagram 600 of a UE 115-*c* configured for autonomous timing adjustment in support of dual-connectivity operation. The UE 115-*c* may be an example of one or more aspects of the UE 115 described with reference to FIGS. 1-5. The UE 115-*c* may include a receiver 505-*a*, a timing module 510-*a*, or a transmitter 515-*a*. The UE 115-*c* may also include a processor. Each of these components may be in communication with each other, and each may be examples of the corresponding modules described with reference to FIG. 5. The timing module 510-*a* may also include a difference determination module 605, and a timing adjustment module 610.

The components of the UE 115-c may, individually or collectively, be implemented with one or more ASICs adapted to perform some or all of the functions described herein in hardware. Alternatively, the functions may be performed by one or more other processing units (or cores), on one or several ICs. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The receiver 505-a may be configured to receive information which may be passed on to the timing module 510-a, and to other components of the UE 115-c. The timing module 510-a may be configured to perform the operations described above with reference to FIG. 5. The transmitter 515-a may be configured transmit the one or more signals received from other components of the UE 115-c.

The difference determination module 605 may be configured to determine a timing difference between a first carrier of a first cell group and a second carrier of the second cell group. For example, for a UE 115-c having dual connectivity with a carrier of an MCG and a carrier of an SCG, the difference determination module 605 may be configured to determine a timing difference between the two carriers as discussed above. In some cases, a timing difference may be determined based on broadcast information.

The timing adjustment module 610 may be configured to adjust a timing of one or more operations in relation to a radio resource configuration of a first carrier of a first cell group or a second carrier of a second cell group, where the adjustment may be based, to some extent, on the determined timing difference. For instance, the timing of a measurement gap, DRX on-duration, RF retuning, or other operation may be adjusted in relation to an RRC configuration. Adjusting the timing may include offsetting the operation in relation to the radio resource configuration by a number of subframes determined in accordance with the timing difference. In some examples, the adjusting or offsetting may be performed autonomously by the UE 115-c—e.g., the UE 115-c may perform adjustments without specific direction from a network.

Figure 7:
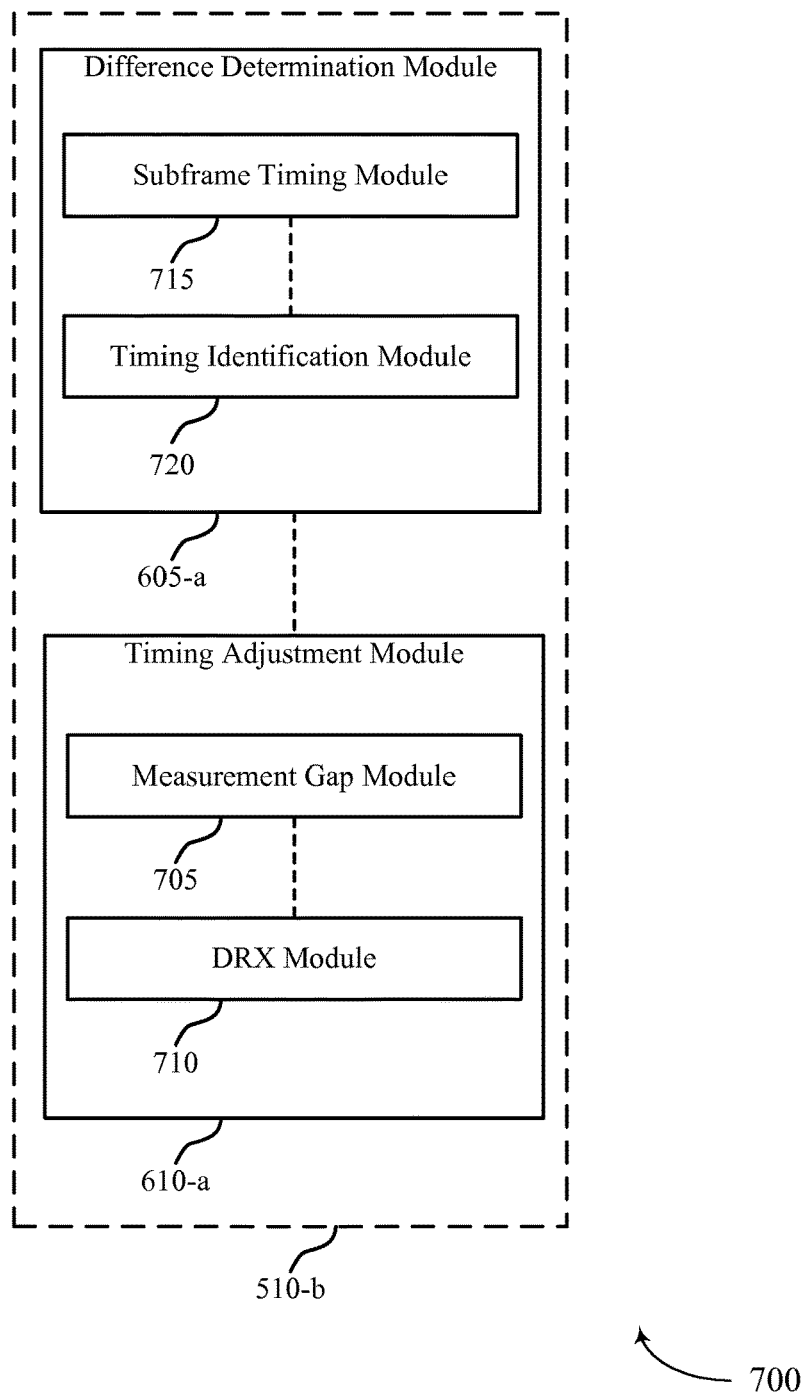
FIG. 7 shows a block diagram of a dual-connectivity device configured for autonomous timing adjustment.

FIG. 7 shows a block diagram 700 of a timing module 510-b configured for autonomous radio resource configuration extension in accordance with various aspects of the present disclosure. The timing module 510-b may be an example of one or more aspects of a timing module 510 described with reference to FIGS. 5 and 6. The timing module 510-b may include a difference determination module 605-a and a timing adjustment module 610-a. Each of these modules may perform the functions of the corresponding modules described above with reference to FIG. 6. The timing module 510-b may also include a measurement gap module 705, a DRX module 710, a subframe timing module 715, and a timing identification module 720.

The components of the timing module 510-b may, individually or collectively, be implemented with one or more ASICs adapted to perform some or all of the applicable functions described herein in hardware. Alternatively, the functions may be performed by one or more other processing units (or cores), on one or more ICs. In other examples, other types of integrated circuits may be used (e.g., Structured/Platform ASICs, an FPGA, or another Semi-Custom IC), which may be programmed in any manner known in the art. The functions of each unit may also be implemented, in whole or in part, with instructions embodied in a memory, formatted to be executed by one or more general or application-specific processors.

The measurement gap module 705 may be configured to generate or recognize a measurement gap on a first carrier or a second carrier, or both. In some examples, the timing adjustment module 610-a may, with the measurement gap module 705, be configured to extend a measurement gap in relation to a measurement gap configuration of a corresponding radio resource configuration. In some examples, extending the measurement gap may be based on a minimum gap length for the UE. Additionally or alternatively, extending the measurement gap may include extending the measurement gap on a first carrier or a second carrier such that the measurement gap on the first carrier and the measurement gap on the second carrier overlap in time and the overlap provides at least the minimum gap length for the UE.

The DRX module 710 may be configured to initiate or recognize a DRX operation of a first carrier or a second carrier, or both. In some examples, the timing adjustment module 610-a may, with the DRX module 710, extend an active DRX duration in relation to the corresponding radio resource configuration. Extending the active DRX duration may include accommodating reception during the active DRX duration on the first carrier or the second carrier for a configured number of subframes. Additionally or alternatively, the timing adjustment module 610-a may, with the DRX module 710, offset a subframe in which RF retuning may be performed. Offsetting the timing of the RF retuning may be based on activity in a cell group. Offsetting the subframe may include accommodating reception during an active DRX duration on a carrier.

The subframe timing module 715 may be configured to determine subframe timing of a first and second carrier. For example, the subframe timing module 715 may be configured to measure carriers of an MCG or an SCG and determine subframe boundaries or other indications of subframe timing for carriers received by a UE 115.

The timing identification module 720 may be configured to identify the timing difference of a first and second carrier based on frame numbering received by the receiver 505-a and the measured subframe timing.

Figure 8:
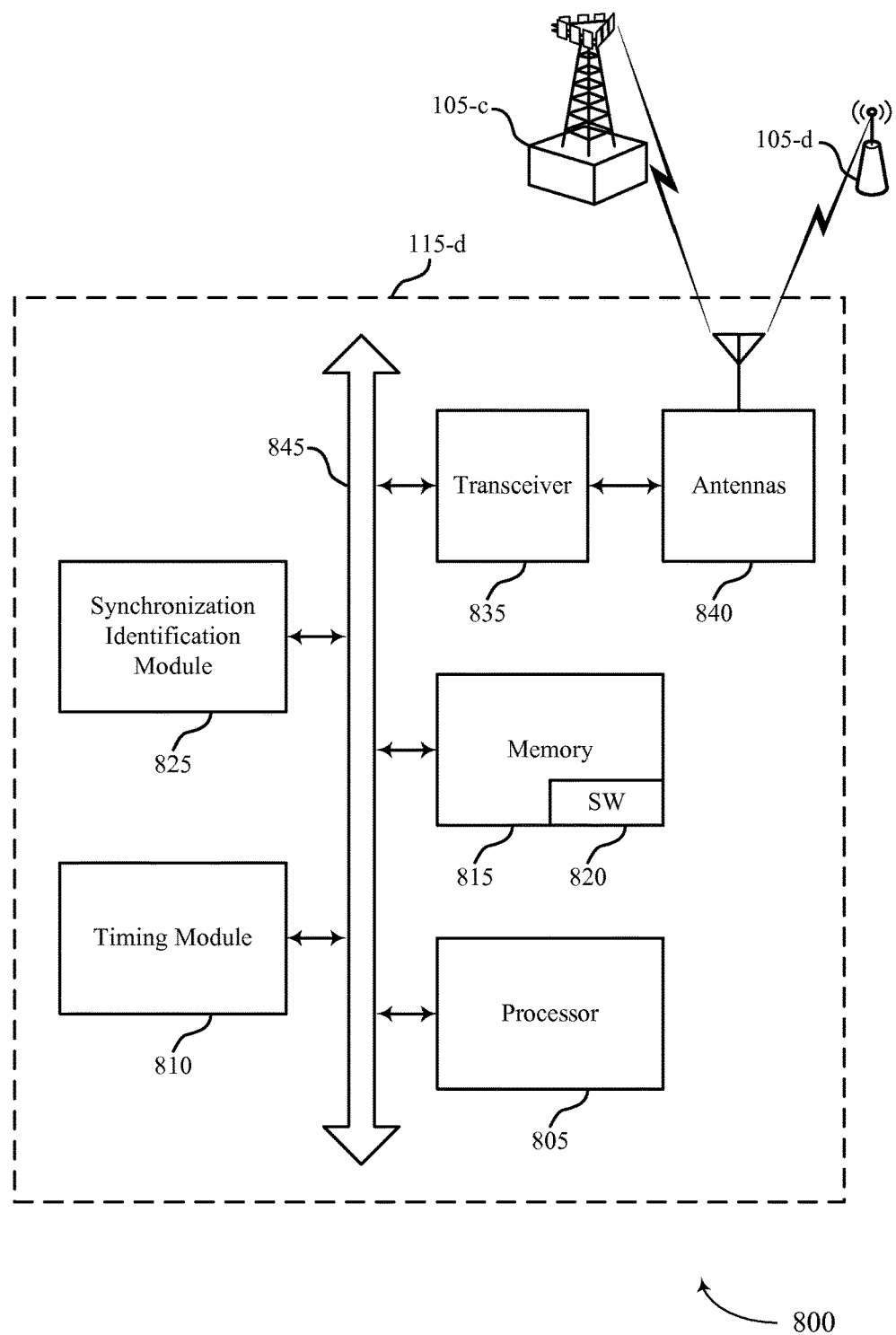
FIG. 8 illustrates a block diagram of a wireless communications system.

Next, FIG. 8 shows a diagram of a wireless communications system 800. Wireless communications system 800 may include a UE 115-d, which may be an example of the UEs 115 described with reference to FIGS. 1-7. The UE 115-d may include a processor module 805, a timing module 810, which may be an example of a timing module described with reference to FIGS. 5-7, memory 815 (including software (SW) 820), a synchronization identification module 825, a transceiver module 835, and one or more antenna(s) 840. Each of the modules of the UE 115-d may communicate, directly or indirectly, with each other (e.g., via one or more buses 845). In examples, the UE 115-d includes components for bi-directional voice and data communications, including components for transmitting communications and components for receiving communications.

The synchronization identification module 825 may be configured to recognize or indicate that a first carrier of a first cell group may be synchronized with carriers of the first cell group and a second carrier of a second cell group may be synchronized with carriers of the second cell group.

The transceiver module 835 may be configured to communicate bi-directionally, via the antenna(s) 840 on one or more wired or wireless links, with one or more networks, as described above. For example, the transceiver module 835 may be configured to communicate bi-directionally with the base stations 105-*c*, 105-*d* in a dual-connectivity setting. The transceiver module 835 may include a modem configured to modulate the packets from processor 805 and deliver a modulated signal to the antenna(s) 840 for transmission, and to demodulate signals received from the antenna(s) 840. While the UE 115-*d* may include a single antenna 840, the UE 115-*d* may also have multiple antennas 840 capable of concurrently transmitting or receiving multiple wireless transmissions.

The memory 815 may include random access memory (RAM) or read only memory (ROM). The memory 815 may store computer-readable, computer-executable software/firmware code 820 containing instructions that are configured to, when executed, cause the processor module 805 to perform various functions described herein (e.g., autonomously determining a timing difference, adjusting a timing, reporting a measurement gap length, etc.). Alternatively, the software/firmware code 820 may not be directly executable by the processor module 805 but be configured to cause a computer (e.g., when compiled and executed) to perform functions described herein. The processor module 805 may include an intelligent hardware device (e.g., a central processing unit (CPU), a microcontroller, an ASIC, etc.), and may include RAM and ROM. The memory 815 may store computer-readable, computer-executable software/firmware code 820 containing instructions that are configured to, when executed, cause the processor module 805 to perform various functions described herein (e.g., call processing, database management, processing of carrier mode indicators, reporting CSI, etc.).

The timing module 810 may perform the same or similar functions described with reference to the timing modules 510 of FIGS. 5 and 6. In some examples, the timing module 810 is configured to perform the functions of the difference determination module 605 and the timing adjustment module 610, including the functions of the sub-modules described in FIG. 7. According to the architecture of the UE 115-*d*, the timing module 810 may be a component in communication with the other components of the UE 115-*d* via the bus 845. Alternatively, the functionality of the timing module 810 may be implemented as computer-executable instructions stored in the memory 815 and executable by the processor module 805 or as an aspect of the transceiver module 835.

Figure 9:
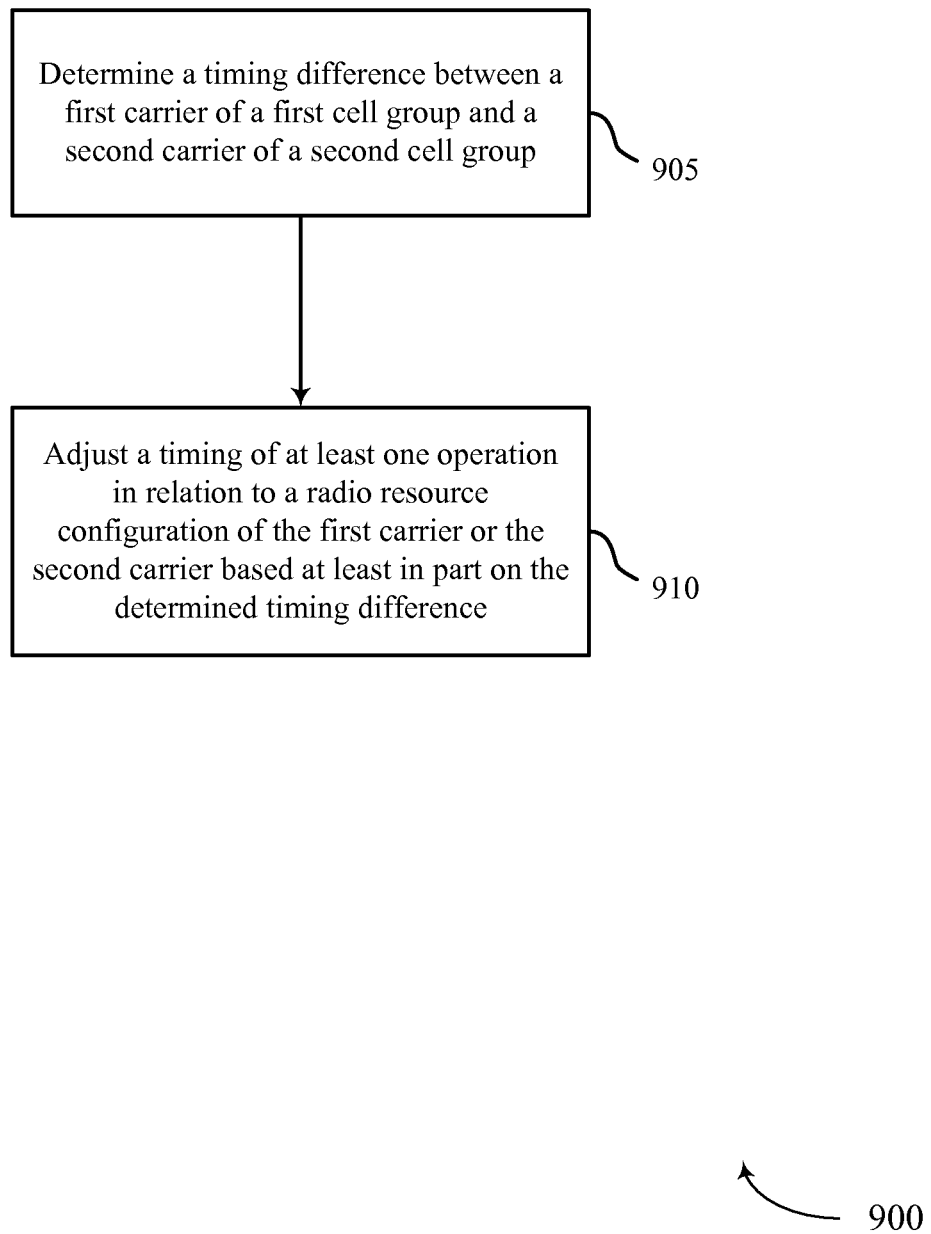
FIG. 9 shows a flowchart illustrating a method which may be performed by a dual-connectivity UE in accordance with the present disclosure.

Turning now to FIG. 9, shown is a flowchart 900 illustrating a method for autonomous timing adjustment by a dual-connectivity UE. The functions of flowchart 900 may be implemented by a UE 115 or its components as described with reference to FIGS. 1-8. In certain examples, the blocks of the flowchart 900 may be performed by the timing module described with reference to FIGS. 5-8.

At block 905, the UE 115 operating in dual connectivity may determine a timing difference between a first carrier of a first cell group and a second carrier of a second cell group. In certain examples, the functions of block 905 may be performed by the difference determination module 605 as described above with reference to FIG. 6.

At block 910, the UE 115 may adjust a timing of at least one operation in relation to a radio resource configuration of the first carrier or the second carrier based at least in part on the determined timing difference. In certain examples, the functions of block 910 may be performed by the timing adjustment module 610 as described above with reference to FIG. 6.

Figure 10:
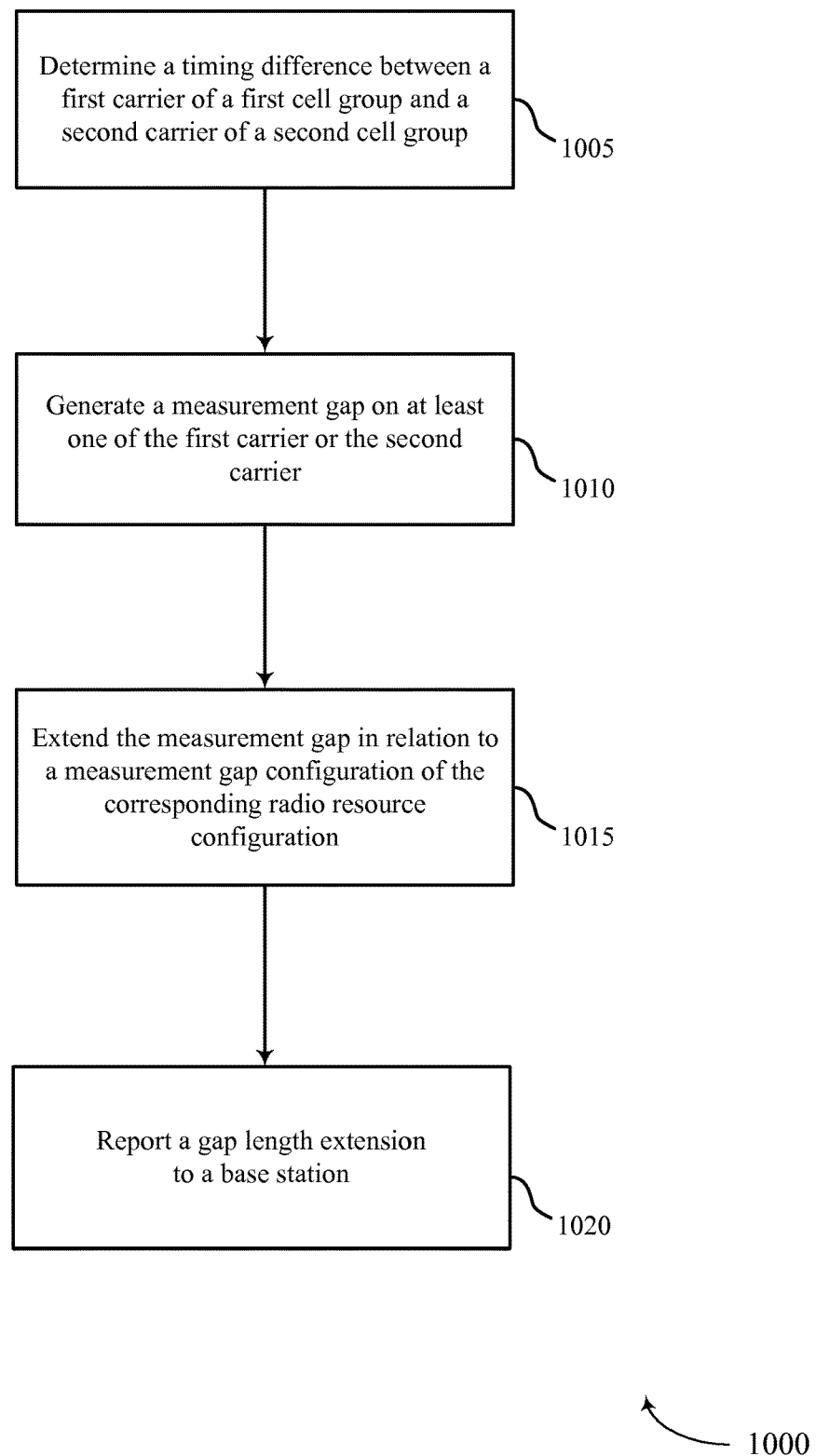
FIG. 10 shows a flowchart illustrating a method which may be performed by a dual-connectivity UE in accordance with the present disclosure.

FIG. 10 shows a flowchart 1000 illustrating a method for autonomous timing adjustment by a dual-connectivity UE. The functions of flowchart 1000 may be implemented by a UE 115 or its components as described with reference to FIGS. 1-8. In certain examples, the blocks of the flowchart 1000 may be performed by the timing module described with reference to FIGS. 5-8. The method described in flowchart 1000 may be an example of the method described in FIG. 9.

At block 1005, the UE 115 may determine a timing difference between a first carrier of a first cell group and a second carrier of a second cell group. In certain examples, the functions of block 1005 may be performed by the difference determination module 605 as described above with reference to FIG. 6.

At block 1010, the UE 115 generate a measurement gap on at least one of the first carrier or the second carrier. In certain examples, the functions of block 1010 may be performed by the measurement gap module 705 as described above with reference to FIG. 7.

At block 1015, the UE 115 may extend the measurement gap in relation to a measurement gap configuration of the corresponding radio resource configuration. In certain examples, the functions of block 1015 may be performed by the measurement gap module 705 as described above with reference to FIG. 7.

At block 1020, the UE 115 may report a gap length extension to a base station. The gap length extension may be based on the determined timing difference and may be indicative of a number of subframes utilized for the measurement gap. In certain examples, the functions of block 1020 may be performed by the transmitter 515 as described above with reference to FIG. 5.

Figure 11:
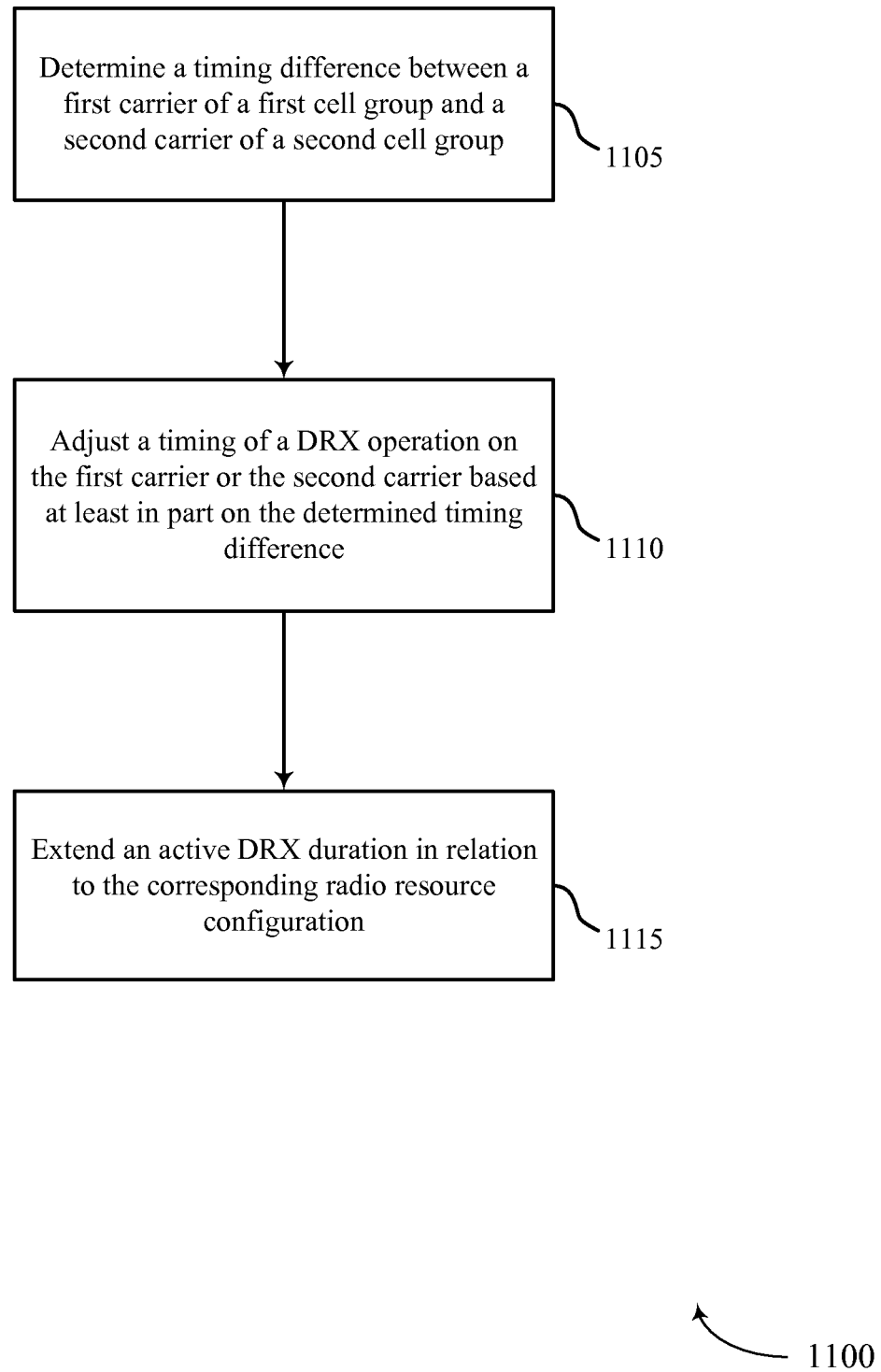
FIG. 11 shows a flowchart illustrating a method which may be performed by a dual-connectivity UE in accordance with the present disclosure.

FIG. 11 shows a flowchart 1100 illustrating a method for timing adjustment by a dual-connectivity UE. The functions of flowchart 1100 may be implemented by a UE 115 or its components as described with reference to FIGS. 1-8. In certain examples, the blocks of the flowchart 1100 may be performed by the timing module as described with reference to FIGS. 5-8. The method described in flowchart 1200 may also be examples of the methods described with reference to FIGS. 9 and 10.

At block 1105, the UE 115 may determine a timing difference between a first carrier of a first cell group and a second carrier of a second cell group. In certain examples, the functions of block 1105 may be performed by the difference determination module 605 as described above with reference to FIG. 6.

At block 1110, the UE 115 may adjust a timing of a DRX operation on the first carrier or the second carrier based at least in part on the determined timing difference. In certain examples, the functions of block 1110 may be performed by the timing adjustment module 610 as described above with reference to FIG. 6.

At block 1115, the UE 115 may extend an active DRX duration in relation to the corresponding radio resource configuration. In certain examples, the functions of block 1115 may be performed by the DRX module 710 as described above with reference to FIG. 7.

Figure 12:
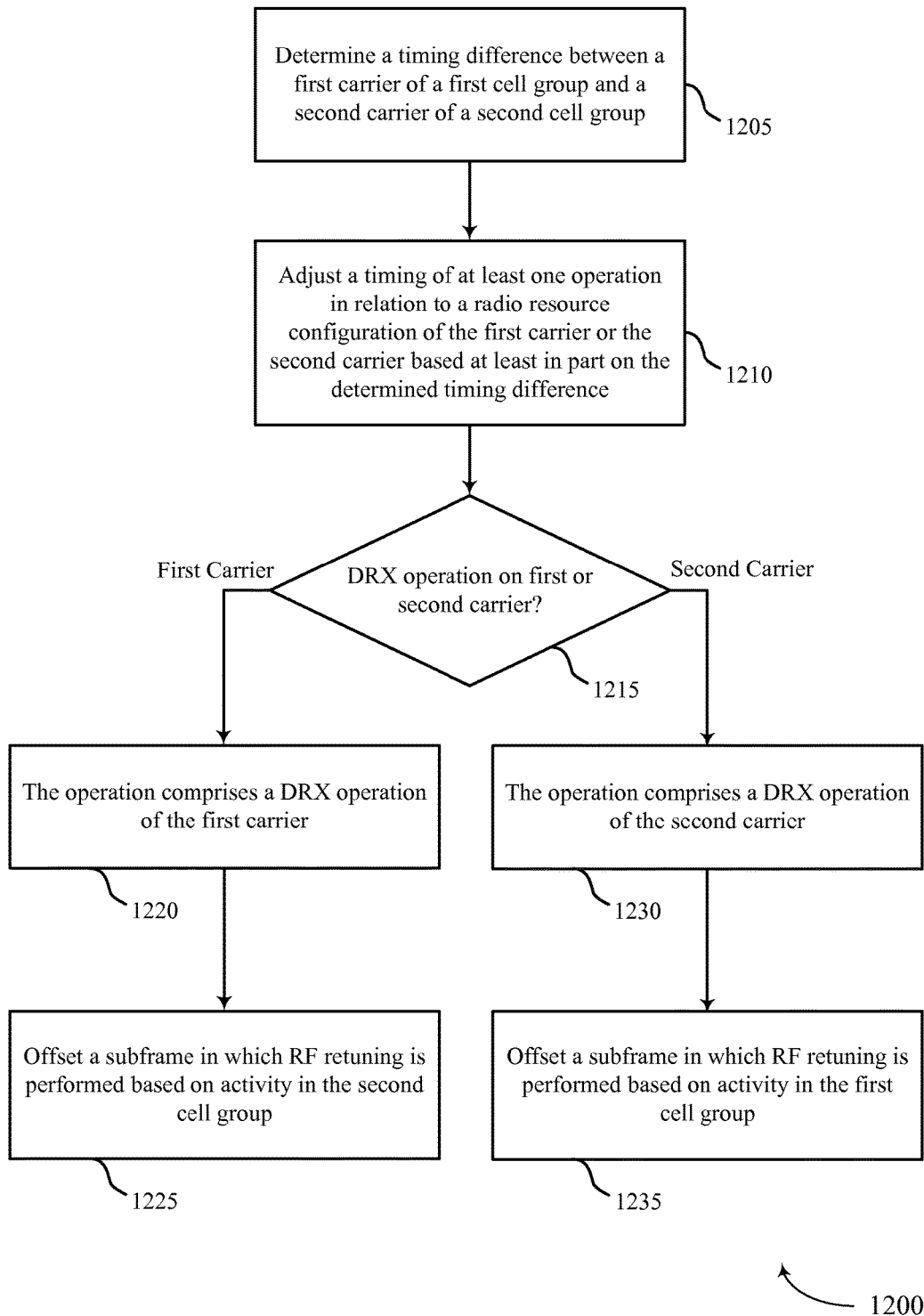
FIG. 12 shows a flowchart illustrating a method which may be performed by a dual-connectivity UE in accordance with the present disclosure.

FIG. 12 shows a flowchart 1200 illustrating a method for timing adjustment by a dual-connectivity UE. The functions of flowchart 1200 may be implemented by a UE 115 or its components as described with reference to FIGS. 1-8. In certain examples, the blocks of the flowchart 1200 may be performed by the timing module as described with reference to FIGS. 5-8. The method described in flowchart 1300 may be examples of the methods described with reference to FIGS. 9-11.

At block 1205, the UE 115 may determine a timing difference between a first carrier of a first cell group and a second carrier of a second cell group. In certain examples, the functions of block 1205 may be performed by the difference determination module 605 as described above with reference to FIG. 6.

At block 1210, the UE 115 may adjust a timing of at least one operation in relation to a radio resource configuration of the first carrier or the second carrier based at least in part on the determined timing difference. In certain examples, the functions of block 1210 may be performed by the timing adjustment module 610 as described above with reference to FIG. 6.

At block 1215, a UE 115 may determine whether the operation includes a DRX operation on the first or second carrier. In certain examples, the functions of block 1215 may be performed by the DRX module 710 as described above with reference to FIG. 7.

At block 1220, the UE 115 may determine that the operation comprises a DRX operation of the first carrier. In certain examples, the functions of block 1220 may be performed by the DRX module 710 as described above with reference to FIG. 7.

At block 1225, the UE 115 may offset a subframe in which RF retuning is performed based on activity in the second cell group. In certain examples, the functions of block 1225 may be performed by the DRX module 710 as described above with reference to FIG. 7.

At block 1230, the UE 115 may determine that the operation comprises a DRX operation of the second carrier. In certain examples, the functions of block 1230 may be performed by the DRX module 710 as described above with reference to FIG. 7.

At block 1235, the UE 115 may offset a subframe in which RF retuning is performed based on activity in the first cell group. In certain examples, the functions of block 1235 may be performed by the DRX module 710 as described above with reference to FIG. 7.

Figure 13:
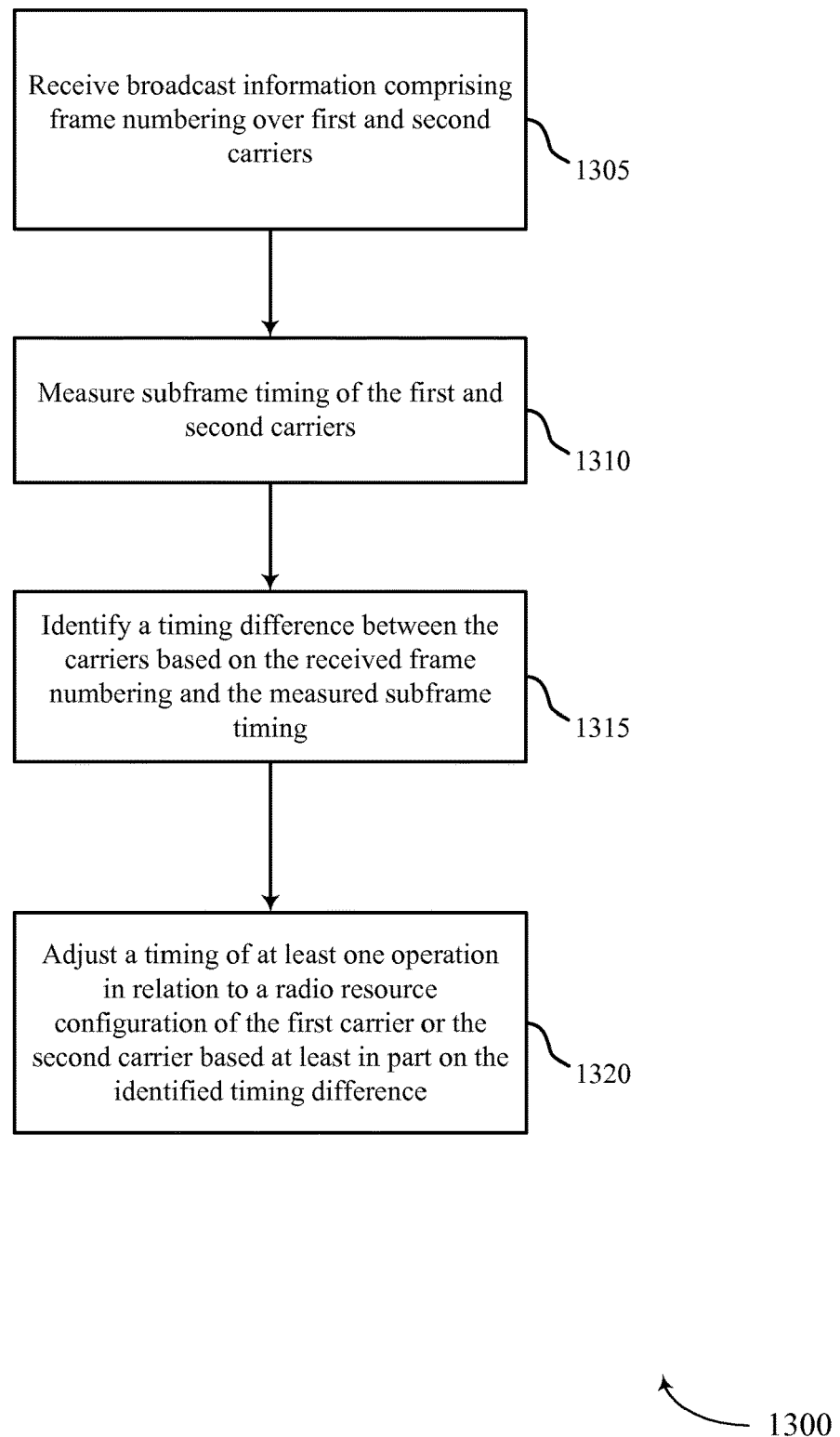
FIG. 13 shows a flowchart illustrating a method which may be performed by a dual-connectivity UE in accordance with the present disclosure.

FIG. 13 shows a flowchart 1300 illustrating a method for timing adjustment by a dual-connectivity UE. The functions of flowchart 1300 may be implemented by a UE 115 or its components as described with reference to FIGS. 1-8. In certain examples, the blocks of the flowchart 1300 may be performed by the timing module as described with reference to FIGS. 5-8. The method described in flowchart 1300 may also be examples of the methods described with reference to FIGS. 9-14.

At block 1305, the UE 115 may receive broadcast information comprising frame numbering over the first or second carriers in dual-connectivity operation. In some examples, the UE 115 may have an SFN of first carrier and may acquire (e.g., measure, receive broadcast information, etc.) subframe information for the second carrier. In certain examples, the functions of block 1305 may be performed by the receiver 505 as described above with reference to FIG. 5.

At block 1310, the UE 115 may measure and determine subframe timing in connection with the first or second carriers. In certain examples, the functions of block 1310 may be performed by the subframe timing module 715 as described above with reference to FIG. 7.

At block 1315, the UE 115 may identify a timing difference between the carriers based on the received frame numbering and the measured subframe timing. In certain examples, the functions of block 1315 may be performed by the timing identification module 720 as described above with reference to FIG. 7.

At block 1320, the UE 115 may adjust a timing of at least one operation in relation to a radio resource configuration of the first carrier or the second carrier based at least in part on the identified timing difference. In certain examples, the functions of block 1320 may be performed by the timing adjustment module 610 as described above with reference to FIG. 6.

Figure 14:
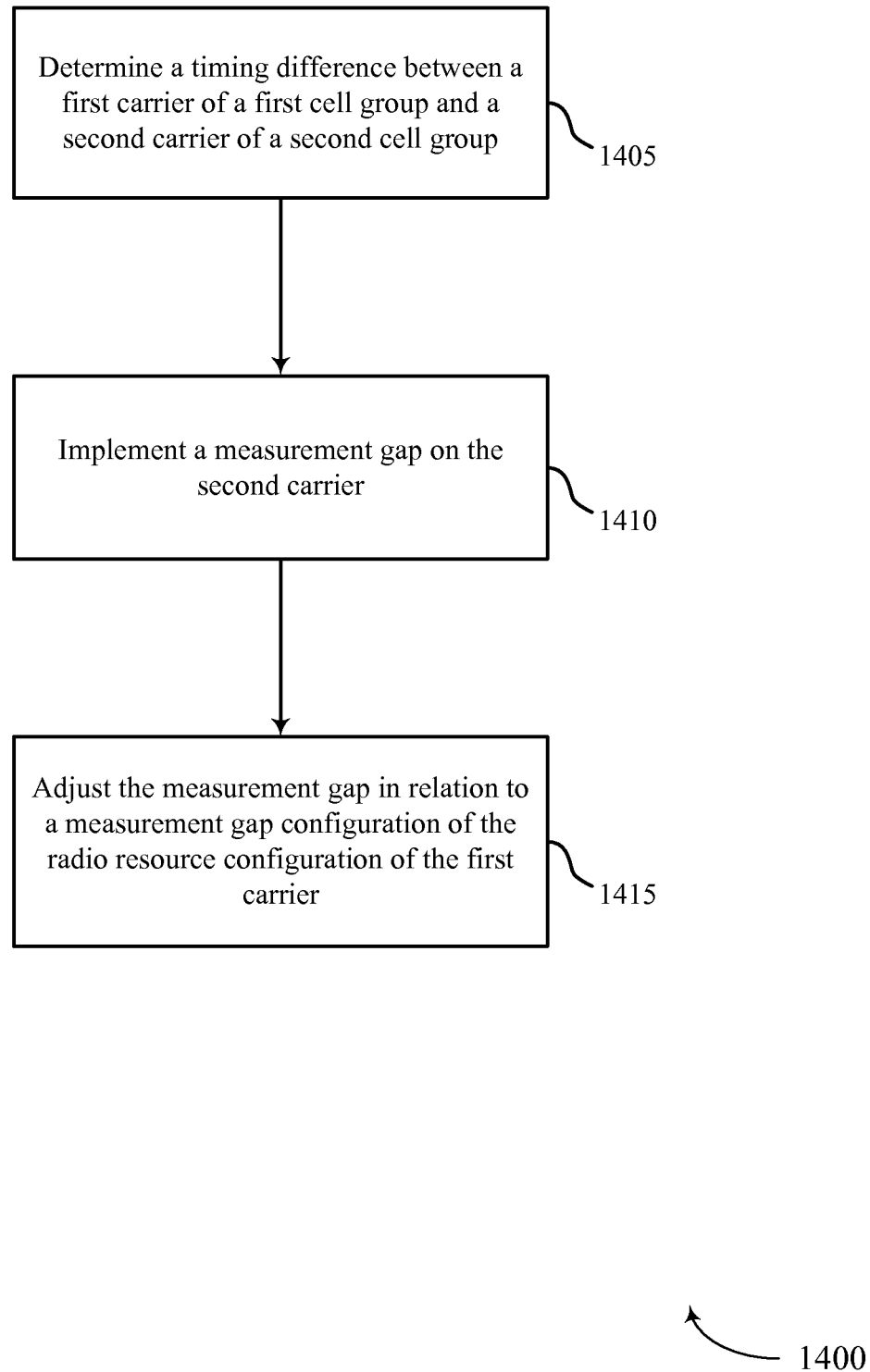
FIG. 14 shows a flowchart illustrating a method which may be performed by a dual-connectivity UE in accordance with the present disclosure.

FIG. 14 shows a flowchart 1400 illustrating a method for autonomous timing adjustment by a dual-connectivity UE. The functions of flowchart 1400 may be implemented by a UE 115 or its components as described with reference to FIGS. 1-8. In certain examples, the blocks of the flowchart 1400 may be performed by the timing module described with reference to FIGS. 5-8. The method described in flowchart 1400 may be an example of the method described in FIG. 9.

At block 1405, the UE 115 may determine a timing difference between a first carrier of a first cell group and a second carrier of a second cell group. In certain examples, the functions of block 1405 may be performed by the difference determination module 605 as described above with reference to FIG. 6.

At block 1410, the UE 115 implement a measurement gap for the second carrier. In certain examples, the functions of block 1410 may be performed by the measurement gap module 705 as described above with reference to FIG. 7.

At block 1415, the UE 115 may adjust the measurement gap for the second carrier in relation to an RRC measurement gap configuration of the first carrier. In certain examples, the functions of block 1415 may be performed by the measurement gap module 705 as described above with reference to FIG. 7.

It should be noted that the methods of flowcharts 900, 1000, 1100, 1200, 1300 and 1400 are just example implementations and that the operations of the method, and the steps may be rearranged or otherwise modified such that other implementations are possible.

The detailed description set forth above in connection with the appended drawings describes various examples and does not represent the only examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of at least one of A, B, or C means A or B or C or AB or AC or BC or ABC (i.e., A and B and C).

Computer-readable media includes both computer-readable storage media and communication media including any non-transitory medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD)ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, include CD, laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method of wireless communication performed by a user equipment (UE) having dual connectivity with first and second network nodes comprising respective first and second cell groups, the method comprising:
   identifying a timing difference between a first carrier of the first cell group and a second carrier of the second cell group; and
   determining, by the UE, a timing offset for performing at least one operation in relation to a radio resource configuration of the first carrier or the second carrier, wherein the timing offset is a number of subframes by which to offset performance of the at least one operation in relation to the radio resource configuration, the number of subframes determined in accordance with the timing difference, and wherein the at least one operation is a measurement gap or a discontinuous reception (DRX) operation.

2. The method of claim 1, wherein:
   performing the at least one operation comprises implementing the measurement gap on the second carrier; and
   determining the timing offset comprises determining to offset the measurement gap on the second carrier in relation to a measurement gap configuration of the first carrier.

3. The method of claim 2, wherein the offset is based at least in part on a minimum gap length for the UE.

4. The method of claim 2, wherein offsetting the measurement gap comprises aligning the measurement gap on the second carrier such that the measurement gap on the second carrier and a measurement gap on the first carrier overlap in time and the overlap comprises a minimum gap length of the UE.

5. The method of claim 1, wherein the UE autonomously determines the timing offset.

6. The method of claim 1, wherein determining the timing difference between the first carrier and the second carrier comprises:
   receiving broadcast information comprising frame numbering for the first and second carriers;

measuring subframe timing of the first and second carriers; and identifying the timing difference based at least in part on the received frame numbering and the measured subframe timing.

7. The method of claim 1, further comprising:
receiving broadcast information comprising a measurement gap configuration for the first carrier, wherein determining the timing offset for performing the at least one operation is based at least in part on the received measurement gap configuration.

8. The method of claim 1, wherein the first cell group comprises a master cell group (MCG) and the second cell group comprises a secondary cell group (SCG).

9. The method of claim 1, wherein:
performing the at least one operation comprises performing the DRX operation on the first carrier; and
determining the timing offset comprises determining to offset a subframe in which radio frequency (RF) retuning is performed in connection with the DRX operation.

10. A user equipment (UE) operable for dual connectivity wireless communication with first and second network nodes comprising respective first and second cell groups, the apparatus comprising:
at least one processor;
a memory in electronic communication with the at least one processor storing instructions which, when executed by the at least one processor, cause the UE to:
identify a timing difference between a first carrier of the first cell group and a second carrier of the second cell group; and
determine a timing offset for performing at least one operation in relation to a radio resource configuration of the first carrier or the second carrier, wherein the timing offset is a number of subframes by which to offset performance of the at least one operation in relation to the radio resource configuration, the number of subframes determined in accordance with the timing difference, and wherein the at least one operation is a measurement gap or a discontinuous reception (DRX) operation.

11. The UE of claim 10, wherein:
performing the at least one operation comprises implementing the measurement gap on the second carrier; and the instructions are executable to cause the apparatus to: offset the measurement gap on the second carrier in relation to a measurement gap configuration of the first carrier.

12. The UE of claim 11, wherein the offset is based at least in part on a minimum gap length.

13. The UE of claim 11, wherein the instructions are executable to cause the UE to:
align the measurement gap on the second carrier such that the measurement gap on the second carrier and a measurement gap on the first carrier overlap in time and the overlap comprises a minimum gap length.

14. The UE of claim 10, wherein the UE is operable to autonomously determine the timing offset.

15. The UE of claim 10, wherein the instructions are executable to cause the UE to:
receive broadcast information comprising frame numbering over the first and second carriers;
measure subframe timing of the first and second carriers; and
identify the timing difference based on the received frame numbering and the measured subframe timing.

16. The UE of claim 10, wherein the instructions are executable to cause the UE to:
receive broadcast information comprising a measurement gap configuration for the first carrier, wherein the timing offset for performing the at least one operation is based at least in part on the received measurement gap configuration.

17. The UE of claim 10, wherein the first cell group comprises a master cell group (MCG) and the second cell group comprises a secondary cell group (SCG).

18. The UE of claim 10, wherein:
performing the at least one operation comprises performing the DRX operation on the first carrier; and
wherein the instructions are executable to cause the apparatus to offset a subframe in which radio frequency (RF) retuning is performed in connection with the DRX operation.

19. A user equipment (UE) operable for dual connectivity wireless communication with first and second network nodes comprising respective first and second cell groups, the UE comprising:
means for identifying a timing difference between a first carrier of the first cell group and a second carrier of the second cell group; and
means for determining a timing offset for performing at least one operation in relation to a radio resource configuration of the first carrier or the second carrier, wherein the timing offset is a number of subframes by which to offset performance of the at least one operation in relation to the radio resource configuration, the number of subframes determined in accordance with the timing difference, and wherein the at least one operation is a measurement gap or a discontinuous reception (DRX) operation.

20. The UE of claim 19, wherein performing the at least one operation comprises implementing the measurement gap on the second carrier, and wherein the means for determining the timing offset comprises:
means for offsetting the measurement gap on the second carrier in relation to a measurement gap configuration of the first carrier.

21. The UE of claim 20, wherein the offset is based at least in part on a minimum gap length.

22. The UE of claim 20, wherein the means for determining the offset further comprises:
means for aligning the measurement gap on the second carrier such that the measurement gap on the second carrier and a measurement gap on the first carrier overlap in time and the overlap comprises a minimum gap length.

23. The UE of claim 19, wherein the means for identifying the timing difference between the first carrier and the second carrier further comprises:
means for receiving broadcast information comprising frame numbering for the first and second carriers;
means for measuring subframe timing of the first and second carriers; and
means for identifying the timing difference based on the received frame numbering and the measured subframe timing.

24. The UE of claim 19, wherein the means for identifying the timing difference between the first carrier and the second carrier further comprises:
means for receiving broadcast information comprising a measurement gap configuration for the first carrier, and wherein the means for determining the timing offset for performing the at least one operation is operable to offset the timing based on the received measurement gap configuration.

25. The UE of claim 19, wherein the first cell group comprises a master cell group (MCG) and the second cell group comprises a secondary cell group (SCG).

26. The UE of claim 19, wherein:
performing the at least one operation comprises the DRX operation on the first carrier; and
the means for determining the timing offset for the timing comprises means for offsetting a subframe in which radio frequency (RF) retuning is performed in connection with the DRX operation.

27. A non-transitory computer-readable medium storing code in support of wireless communication performed by a user equipment (UE) having dual connectivity with first and second network nodes comprising respective first and second cell groups, the code comprising instructions executable to:
identify a timing difference between a first carrier of the first cell group and a second carrier of the second cell group; and
determine a timing offset for performing at least one operation in relation to a radio resource configuration of the first carrier or the second carrier, wherein the timing offset is a number of subframes by which to offset performance of the at least one operation in relation to the radio resource configuration, the number of subframes determined in accordance with the timing difference, and wherein the at least one operation is a measurement gap or a discontinuous reception (DRX) operation.

* * * * *